United States Patent
Kushida

[15] 3,651,658
[45] Mar. 28, 1972

[54] DEVICE FOR PREVENTING AN ENGINE FROM OVERHEATING

[72] Inventor: Keizo Kushida, Anjyo, Japan
[73] Assignee: Mitsubishi Jukogyo Kabushiki Kaisha, Tokyo, Japan
[22] Filed: Oct. 21, 1970
[21] Appl. No.: 82,698

[52] U.S. Cl. ................................62/228, 62/230, 62/243, 62/323, 192/103 R, 200/80 R
[51] Int. Cl. ..........................................B60h 3/04
[58] Field of Search ..............62/133, 230, 243; 73/519, 323; 123/41.11; 192/103 R; 200/80

[56] References Cited

UNITED STATES PATENTS

| 2,825,233 | 3/1958 | Jacobs | 200/80 R |
| 3,021,402 | 2/1962 | La Warre et al. | 73/519 |
| 3,121,314 | 2/1964 | Koyanagi | 62/243 X |
| 3,239,038 | 3/1966 | Peras | 192/103 R |
| 3,462,964 | 8/1969 | Haroldson | 62/133 |

Primary Examiner—William F. O'Dea
Assistant Examiner—P. D. Ferguson
Attorney—Oblon, Fisher & Spivak

[57] ABSTRACT

A device is provided for preventing overheating of an automotive vehicle engine also used for operating an air-conditioning system for the vehicle which features an engine-driven belt pulley having an electrically conducting plate attached to one side, a magnet in juxtaposed relation to the plate and rotatably disposed on the same axis as the plate, resilient means connecting the magnet and a fixed member for permitting angular displacement of the magnet corresponding to a torque acting thereon, and a cam connected to the magnet and operative to open and close a switch for shutting off or starting the compressor unit of the air conditioner, depending upon the torque being experienced, for thereby preventing the engine from becoming overheated when operated at speeds and under such loads which normally might cause overheating.

6 Claims, 3 Drawing Figures

PATENTED MAR 28 1972 3,651,658

INVENTOR
KEIZO KUSHIDA

BY Oblon, Fisher, & Spivak
ATTORNEYS

3,651,658

DEVICE FOR PREVENTING AN ENGINE FROM OVERHEATING

BACKGROUND OF THE INVENTION

This invention relates to an overheating prevention device for engines which has particular utility in automotive vehicles equipped with air-conditioning.

Many automotive vehicles are currently being equipped with air-conditioning, or cooling devices, which utilize the same motive power developed by the automobile engine for driving the vehicle for operating a compressor unit therefor, which constitutes an additional load on the engine. Moreover, a condenser for the air-conditioning system is usually positioned in front of the automobile radiator for cooling the engine. With this arrangement, adequate ventilation of the radiator is prevented and dissipation of heat therefrom is obstructed, so that overheating of the engine and even engine failure, in some cases, attributed to the overheating, often results. This overheating of the engine is most likely to occur when the engine is being operated at low speeds or at high speed under high load, such as, when the engine is idling, for example, in heavy rush-hour traffic, or when the vehicle is climbing a hill, or rapidly accelerating in overtaking another vehicle and travelling at maximum speed. An added disadvantage of the conventional system described herein lies in the fact that it ordinarily is quite expensive.

SUMMARY OF THE INVENTION

Accordingly, it is an object of the present invention to provide an apparatus for use in combination with an automotive vehicle air-conditioning system powered by the vehicle engine which prevents overheating of the engine when it is operated at speeds and under such loads which normally would cause the same to overheat.

Another object of the present invention is to provide an auxiliary device for use with an ordinary automotive vehicle air-conditioning system powered by the vehicle engine which is operative to start or shut off the air-conditioning system according to predetermined engine loading conditions to prevent the engine from becoming overheated.

Still another object of this invention is to provide a device for preventing overheating of an automotive vehicle engine being used for powering an air-conditioning system in the vehicle which is compact, lightweight, inexpensive and reliable in performance.

These and other objects are attained by the present invention which embodies a device for preventing overheating of an engine which is characterized by an engine-operated belt pulley having an electrically conducting plate attached to one side surface thereof, a magnet positioned in juxtaposed relation to the electrically conducting plate and rotatably disposed on the same axis as the belt pulley, resilient means mounted between the magnet and a stationary member for limiting the angular displacement of the magnet corresponding to the torque acting on the magnet, a switch mounted on the stationary member for starting and shutting off the air-conditioner compressor, or other driven device adapted also to be operated by the engine, and a cam member connected to the magnet and adapted to open the switch when the rotational angle of the magnet exceeds a predetermined value.

BRIEF DESCRIPTION OF THE DRAWINGS

Various other objects, features and advantages of the present invention will be more readily appreciated as the same becomes better understood from the following detailed description when considered in connection with the accompanying drawings, wherein like reference numerals designate like or corresponding parts in the several figures, and in which.

DESCRIPTION OF AN ILLUSTRATIVE EMBODIMENT

Figure 1:
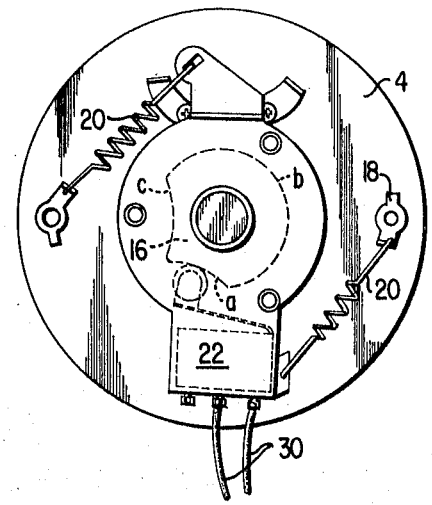
FIG. 1 is a front view of an embodiment constructed according to the present invention and illustrating essential portions of a device for preventing overheating of an engine.
Figure 2:
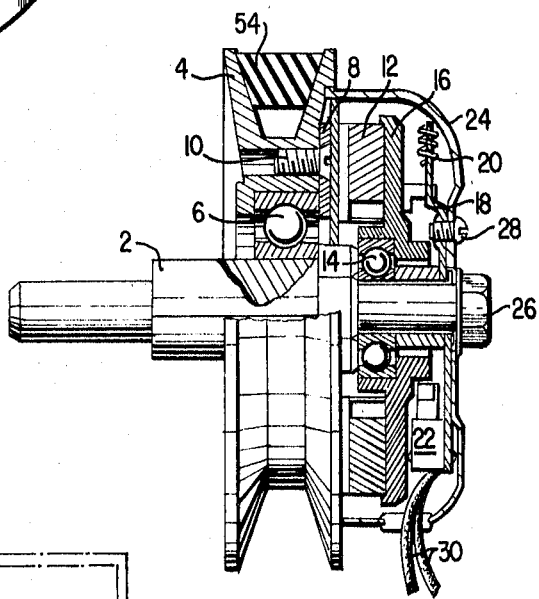
FIG. 2 is a longitudinal sectional view thereof.

Referring now to the drawings, and more particularly to FIGS. 1 and 2 thereof, the numeral 2 designates a shaft which is adapted to be driven by the engine of the automobile, as will be described hereinbelow, having a belt pulley 4 rotatably mounted thereon through a bearing 6. An annular electrically conducting plate 8 is secured by screws 10 to one side surface of the pulley 4. Mounted on the shaft 2 through a bearing 14 for providing relative rotary freedom therewith, and disposed on the same side of the pulley 4 as the conducting plate 8, is a cam member 16 having a permanent magnetic piece 12, also of annular configuration, secured thereto and disposed between the cam and the conducting plate in juxtapositioned relation thereto. The permanent magnet 12 thus rotates with the cam member 16 as a unit.

Each of a pair of substantially diametrically opposed control springs 20 is attached at one end to a fixed member 18 and is connected at its other end to the cam member 16. Thus, when a rotational torque acts on the permanent magnet 12, the cam member 16 becomes stationary in a position in which the tensile force of the control springs 20 and the torque are balanced.

The cam member 16 is formed with the cam surfaces $a$, $b$ and $c$ on a flanged portion thereof formed on the side opposite the attached permanent magnet 12, being of smaller radial proportions than the cam, as shown in FIG. 1, so that projections of the cams are operative to close an electric contact of a juxtapositioned microswitch 22 when the cam member 16 rotates within a predetermined range of angles. A cover 24 for protecting the movable parts and switch section of this device from dust and the like is secured by a bolt 26 to the end of the shaft 2, and at the same time, fixedly supports the fixed members 18 by screws 28, as shown in FIG. 2. Also shown therein are the leads 30 for the microswitch 22, for connecting the same to a suitable power source and appropriate control circuitry.

Figure 3:
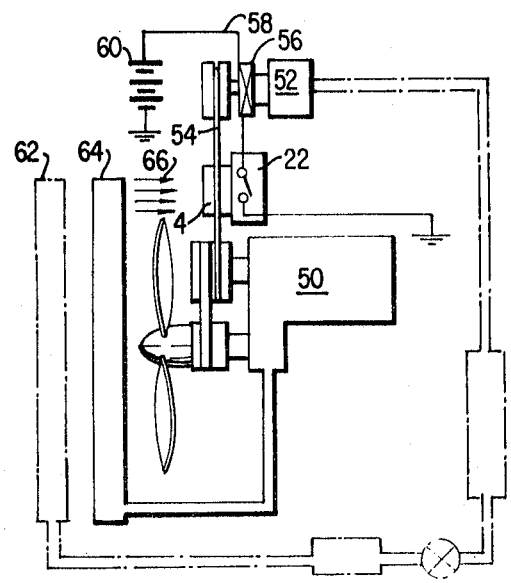
FIG. 3 is a schematic view showing the device formed according to this invention being incorporated in an automotive vehicle.

FIG. 3 schematically shows the device of this invention described hereinbefore being incorporated in a vehicle. A belt pulley for adjusting the tension of a V-belt 54 trained about an engine 50 and an air-conditioning compressor 52 is the belt pulley 4 shown in FIGS. 1 and 2. The electric contact of the microswitch 22 is inserted in series with a circuit 58 including an electromagnetic clutch 56 of conventional design for rendering the compressor 52 alternatively operative or inoperative, and a battery 60. As the electric contact is closed and opened, the air-conditioning compressor 52 is respectively rendered operative and inoperative.

The operation of the device according to this invention will now be explained. The belt 54 for operating the compressor 52 of the vehicle air-conditioner also operates the belt pulley 4 at a rate proportional to the rate of rotation of the engine driving shaft, and the magnetic flux of the permanent magnet 12 is cut by the electrically conducting plate 8 attached to one side surface of the belt pulley 4. This produces a torque in the cam member 16 which is rotated through an angle to a position in which the torque and the tension of the control springs 20 are balanced. While the vehicle is running within the range of engine speeds which does not promote overheating of the engine, the angular displacement of the permanent magnet 12, or the cam member 16, is such that the microswitch 22 is actuated by the portion $b$ of the cam member 16 and the contact thereof is closed, so that the electromagnetic clutch 56 is actuated to render the compressor 52 operative.

On the other hand, the microswitch is maintained in an open position while the engine is operated at low speeds or high speeds at which overheating of the engine is promoted, or while the cam member 16 contacts the electric switch with its surface portions $a$ and $c$. Accordingly, the electromagnetic clutch 56 is de-energized and the compressor 52 is rendered inoperative. It will be appreciated, then, that if the cam member 16 is formed in a suitable shape and configuration, it will be possible to render the air-conditioning compressor operative and inoperative at any engine speeds, as desired, depending on the characteristics of the engine.

If the device constructed according to this invention is further provided with a thermostat connected in parallel with the microswitch, it will be possible to detect the temperature of the hot blast of air indicated by the arrows 66 passing through a condenser 62 for the air-conditioner and a radiator 64 for the motor vehicle, as the hot blast of air directly impinges on the present device. It thus is possible to effect prevention of overheating of the engine by taking into consideration the degree at which the engine is heated.

From the foregoing description, it will be appreciated that the device formed according to this invention, which has the aforementioned features has many advantages over the prior art. According to this invention, for example, it is possible, by merely replacing a conventional belt pulley by the device described herein, to readily render the air-conditioning compressor inoperative when the vehicle is running at engine speeds at which overheating of the engine is likely to occur. More particularly, there is provided, according to this invention, an engine overheating prevention device which is compact in size, light in weight, low in cost and reliable in performance and which automatically permits rendering the air-conditioning compressor operative and inoperative at any engine speed likely to promote overheating, regardless of whether the vehicle is running at low or high speed.

Obviously, many modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of The United States is:

1. In combination with an engine-driven device, means for preventing said engine from overheating because of added load being imposed thereon by another device being co-laterally operated thereby, comprising:
    a belt pulley driven by said engine;
    an electrically conducting plate attached to one side surface of said pulley;
    a magnet being positioned in side-by-side juxtaposed relation to said electrically conducting plate and being rotatably mounted on the same axis as said belt pulley;
    resilient means mounted between said magnet and a fixed member for limiting the angular displacement therebetween corresponding to a torque acting on the magnet;
    a switch mounted on said fixed member and connected in a circuit for starting and shutting off said another device being operated by the engine; and
    means connected to said magnet for opening said switch when the rotational angle of the magnet reaches a predetermined value.

2. The device set forth in claim 1 wherein said another device is a compressor of an air-conditioning system.

3. The device set forth in claim 2 wherein said means for opening said switch comprises a cam member.

4. The device set forth in claim 3 wherein said cam member is rotatably mounted on the same shaft as said belt pulley and said magnet is secured to said cam member and supported thereby for rotary movement therewith.

5. The device set forth in claim 4 wherein said resilient means comprises at least one spring member.

6. The device set forth in claim 4 wherein said electrically conducting plate and said magnet are substantially annular in configuration.

* * * * *